United States Patent [19]

Rosenblad

[11] Patent Number: 4,585,520

[45] Date of Patent: Apr. 29, 1986

[54] METHOD AND APPARATUS FOR CLOSING THE VENT OF AN EVAPORATOR

[75] Inventor: Axel E. Rosenblad, Monmouth Hills, N.J.

[73] Assignee: Rosenblad Corporation, Princeton, N.J.

[21] Appl. No.: 485,607

[22] Filed: Apr. 18, 1983

[51] Int. Cl.⁴ .................... B01D 1/10; B01D 1/22; B01D 1/30
[52] U.S. Cl. .................... 159/47.1; 159/23; 159/31
[58] Field of Search .................... 159/47 R, 31, 43.1, 159/44, 23, 1 R, 47.1; 203/1; 237/67, 64; 165/40

[56] References Cited

U.S. PATENT DOCUMENTS

| | | | |
|---|---|---|---|
| 904,499 | 11/1908 | Ammon | 237/67 |
| 2,341,738 | 2/1944 | Olin | 237/67 |
| 2,368,049 | 1/1945 | Stratford | 159/44 |
| 3,356,124 | 12/1967 | Dambrine | 159/44 |
| 3,966,559 | 6/1976 | Athanassiadis | 159/43.1 |

*Primary Examiner*—David L. Lacey
*Attorney, Agent, or Firm*—Brooks Haidt Haffner & Delahunty

[57] ABSTRACT

A method and apparatus to prevent water hammer and condensation shock in evaporators by closing a vent line when the condensate level rises in an evaporator, thus causing steam flow to the evaporator to stop. The apparatus prevents continuing entry of steam through a steam inlet and thus prevents damage to the evaporator equipment.

3 Claims, 1 Drawing Figure

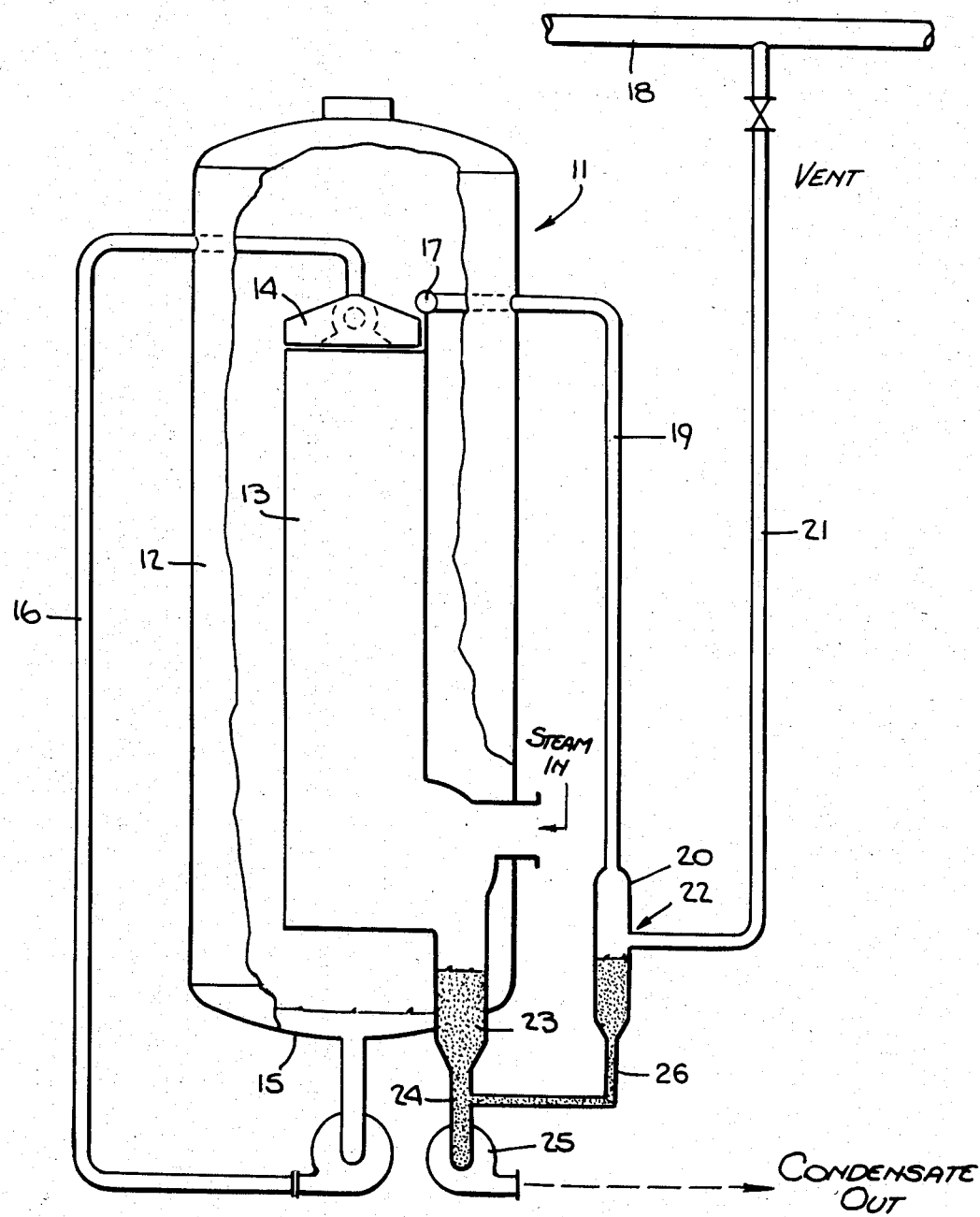

METHOD AND APPARATUS FOR CLOSING THE VENT OF AN EVAPORATOR

BACKGROUND OF THE INVENTION

1. Field of the Invention

The invention relates to evaporators and more particularly to a system for avoiding shocks which can result from flooding of evaporators of the type having bottom steam inlets.

2. Description of the Prior Art

There are advantages to introducing steam into an evaporator through an inlet located at or near the bottom of the evaporator. The use of bottom steam inlets for both plate-type and tube-type evaporators is known. However, use of such a bottom steam inlet entails a potential operating problem.

As the heating steam condenses within the evaporator, the condensate flows downward, and is removed. If condensate is not removed as fast as further condensate is produced by condensation of the steam which enters the evaporator, the level of condensate will rise. This condition can result from any kind of failure in the condensate removal system, such as a malfunction in a pump or control valve. When the condensate level becomes too high, steam entering the evaporator will be condensed while submerged in the condensate, causing condensation shock or water hammer.

Under some conditions such shock or water hammer can be very severe, causing very substantial damage to the surrounding heating surface, regardless of the surface's structure, whether plate or tubular. It is imperative that an evaporator not be operated under these conditions for any extended period.

No reliable and economically reasonable solution for this problem has been available.

SUMMARY OF THE INVENTION

The method and apparatus of the invention protect evaporators having bottom steam inlets from condensation shock or water hammer by effectively stopping the flow of steam and evaporation when the condensate level becomes too high for normal operation. This is accomplished by closing the vent line of the evaporator automatically when the condensate level becomes too high for whatever reason.

In accordance with the invention, the vent line of an evaporator is interconnected with the space at which condensate collects before the condensate is removed from the evaporator. When the condensate level in the evaporator rises above a certain height, condensate floods the vent line, trapping the uncondensed vapor and gas in the evaporator, thus stopping further steam from flowing into the evaporator and condensing therein. Steam flow and evaporation do not begin again until the condensate level recedes enough to reopen the vent line.

The control system of the invention can be installed in new evaporators at a very reasonable cost, and can also be readily incorporated into existing equipment.

BRIEF DESCRIPTION OF THE DRAWING

The drawing illustrates, somewhat schematically, an evaporator provided with apparatus according to the invention for closing the evaporator vent.

DETAILED DESCRIPTION OF THE PREFERRED EMBODIMENT

The drawing shows an evaporator comprising an evaporator vessel 11 with part of the vessel wall 12 cut away to show internal structure. The evaporator heating surface 13 is shown as being of the plate type in which heating steam flows between pairs of opposed plates, but the method and apparatus of the invention are also applicable to tube-type evaporators in which heating steam flows within tubes. Liquid to be evaporated is distributed to the heating surface 13 by means 14, to flow down the heating surface 13. Liquid which has not evaporated during its passage over the heating surface 13 collects at the bottom 15 of the vessel, whence the unevaporated liquid can be circulated back via a conduit 16 to the liquid distributing means 14 to be passed again over the heating surface along with new feed liquid for evaporation.

A vent header 17 is provided for the escape of uncondensed vapor and gases from the spaces between the plates (or within the tubes) of the heating surface 13. In a conventional evaporator the vent vapor and gases would ordinarily be led from the evaporator vessel 11 to a discharge pipe such as the pipe shown at 18 for discharge or further use or treatment.

In accordance with the present invention, the vent gases and uncondensed vapor travel to the pipe 18 only when the condensate level is sufficiently low that entering steam cannot condense while submerged in condensate. Thus, in the preferred embodiment of the apparatus shown in the drawing, exiting vent gases and uncondensed steam travel from the header 17 through a pipe 19 to a chamber 20 connected by a pipe 21 to the discharge pipe 18. The chamber 20 contains a condensate at a level representing the level of condensate within the evaporator. The pipe 21 opens onto the chamber 20 at a point 22 which is above the level of condensate in the chamber 20 under normal operating conditions, but if the level of condensate in the chamber rises, representing an elevated condensate level in the evaporator, the opening 22 is closed, preventing passage of uncondensed steam and vent gas, and thereby precluding the continuing flow to the evaporator of steam to be condensed.

For this purpose, the evaporator can, as shown in the drawing, be connected to the chamber 20 in such a way that condensate collected in the evaporator flows freely to the chamber 20.

In the evaporator system shown in the drawing, condensate formed within the heating surface 13 flows to a header 23 connected by a drain pipe 24 shown connected to a condensate discharge pump 25. Upstream of the pump 25, a branch pipe 26 connects the header 23 to the chamber 20 so condensate backing up in the pipe 24 will cause a rise in the condensate level in the chamber 20 representative of the condensate level in the header 23. If the pump 25 malfunctions, or the discharge of condensate is impaired in some other way, the rising condensate in the chamber 20 will close the opening at 22, cutting off venting. It will readily be understood that a header like the header 23 can be employed with either tube or plate heating surface, or that some other structure such as a well or tank connected to receive condensate can be employed. The structure shown represents the presently preferred means of carrying out the method of the invention.

Various applications, modifications and design variations will suggest themselves to those acquainted with evaporator technology, and are considered to be within the spirit and scope of the present invention.

What is claimed is :

1. A method of closing the vent line of an evaporator for preventing water hammer and condensation shock in the evaporator, in which the evaporator is of the type in which heating steam is introduced near the evaporator bottom, condensate condensed from said heating steam is collected, and uncondensed steam is vented through said vent line, comprising leading condensate to a chamber interposed in said vent line, which chamber has an outlet at a predetermined level below the point at which steam is introduced into the evaporator for closing said vent line when the actual level of condensate rises higher than said predetermined level in said chamber, thereby preventing the introduction into the evaporator of further heating steam at a level submerged below the condensate surface.

2. In combination with an evaporator having a bottom zone, means for introducing heating steam to said bottom zone, and means for discharging condensate from said bottom zone, and a vent line for venting uncondensed steam, apparatus for preventing water hammer and condensation shock in the evaporator comprising a chamber interposed in said vent line having an outlet positioned at a predetermined level below the point at which said steam introducing means introduces steam to the evaporator, means connecting said chamber to said condensate discharging means for introducing condensate to said chamber to close the vent line when the level of condensate in said chamber exceeds said predetermined level thereby blocking said outlet of said chamber to prevent submerged entry of steam.

3. The combination of claim 2 wherein the condensate discharging means comprises a header and a drain pipe, said drain pipe being connected to said chamber by a branch pipe for causing the condensate level in the chamber to represent the condensate level in the header.

* * * * *